R. G. MUELLER.
SHOCK ABSORBER.
APPLICATION FILED MAY 1, 1907.
949,833. Patented Feb. 22, 1910.
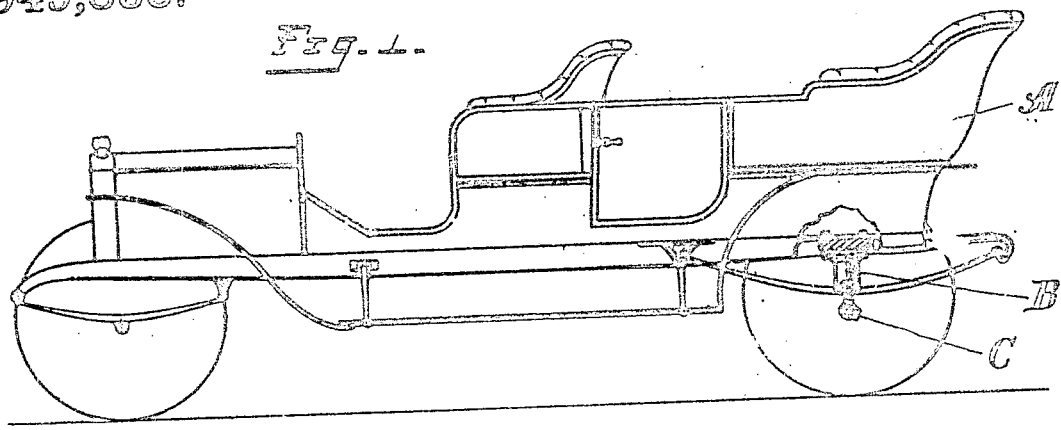
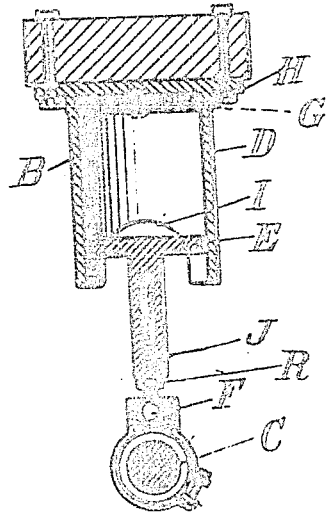
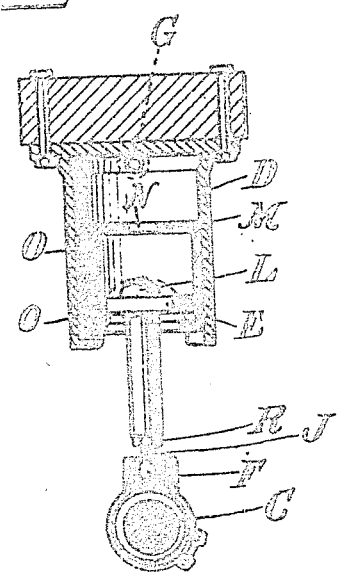
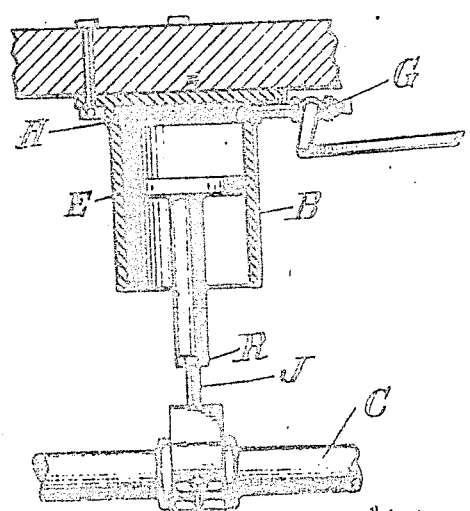

UNITED STATES PATENT OFFICE.

ROBERT G. MUELLER, OF YONKERS, NEW YORK, ASSIGNOR OF ONE-HALF TO FREDERICK GEH, OF NEW YORK, N. Y.

SHOCK-ABSORBER.

949,832.

Specification of Letters Patent. Patented Feb. 22, 1910.

Application filed May 1, 1907. Serial No. 371,220.

*To all whom it may concern:*

Be it known that I, ROBERT G. MUELLER, of Yonkers, Westchester county, State of New York, have invented certain new and useful Improvements in Shock-Absorbers, of which the following is a full, clear, and exact description, reference being had to the accompanying drawings, forming part of these specifications, in which—

Figure 1 illustrates a side view of my shock absorber as applied to an automobile. Fig. 2 is a sectional view of one form of my shock absorber, Fig. 3, a sectional view of another form thereof, and Fig. 4 is a sectional view of a third form.

My invention relates to pneumatic shock absorbers and has for its object to take up the more violent jars of the roadway and to relieve the ordinary carriage springs from the strain of such shocks.

The principal features of my invention consist in the creation of a braking effect caused by suction and expulsion of air, the energy of which is controlled by the speed of the vehicle at the moment of the shock.

The principle on which my shock absorber works is that of a cylinder and piston, it being important however that the distance between the piston and cylinder head should be comparatively small so that the compression of the air in the absorber will result almost instantly rather than after an interval of time as is the case of similar shock absorbers, having relatively large air contents. The latter operate on the principle of using the air as an elastic cushion.

A favored improvement to be found in my invention is the provision for a piston acting in itself as a universal joint.

Other features will be referred to later.

In the drawings, A represents the body of an automobile and B the shock absorber interposed between the vehicle body and the wheel axle C. The upper cylindrical casing D of my shock absorber is attached to the body of the automobile in any suitable manner either by bolts as shown in Fig. 2 or if desired by universal joint. Attached to the wheel axle C or a connection thereof is the plunger E arranged to work up and down in the cylinder D. A universal joint F is shown at one end of the piston rod so that the piston can adapt itself to the sideward motions of the vehicle. The outer surface of the piston head E where it coöperates with the cylinder D is spherically rounded. The entire piston head may be in the form of a complete sphere, the object hereof being that there shall be an efficient coöperation by the piston head and the cylinder no matter what relative position the cylinder and the piston head occupy with reference to each other. The spherically rounding off of the piston head is also valuable in permitting access and escape of air into and from the cylinder and also acts to guide this air past the place where it is most useful to wit, where the cylinder wall and the piston approach most closely.

Except for the rush of air, there would be a line contact between the piston head and cylinder. To operate in the spirit of my invention, there should be no contact between the piston head and cylinder at any time. The vibration of the vehicle and of the wheels with relation thereto results in a continuous relative motion of the piston head and the cylinder. This results in the creation of a succession of small compressions of air which tends to escape from the cylinder past the edges of the piston head E and a suction on the return movement which tends to draw air into the cylinder past the edges of the piston head. In case the wheels suddenly strike an obstacle thereby creating most violent and extraordinary compression of air in the cylinder, there will invariably be comparatively no friction because of the tendency of the air to escape between the piston head and the cylinder, forming an air film space between the two and preventing friction. I also provide an adjustable valve G on the cylinder, whereby the air compression can be still further regulated by the occupant of the automobile or other vehicle.

It will be seen from the above description that by reason of the comparatively small air space between the piston head and cylinder head, any sudden shock or violent motion will instantly tend to compress the air which prevents any violent motion in the machine body. On the return stroke, there will be an equally violent suction, by not using the air as a cushion but by allowing it to escape between the cylinder and piston head, each movement of the piston head E will have a maximum operating value.

In the modification shown in Fig. 2, I have provided a rubber cushion H at the top of the cylinder to prevent any accidental contact between the piston head and cylinder head. I have also shown the cylinder with a cut-out portion I, so located with reference to the normal position of the two surfaces as to prevent effective action of any kind except in the case of abnormal shock. In case this feature is not desirable, the piston head E can be adjusted by means of the screw J and nut R. If the piston head is screwed up a considerable distance in Fig. 2, the mechanism there shown will be substantially that of Fig. 4 in operation.

In Fig. 3 I have shown a modification wherein the piston head E is provided with a rubber tip L and normally operates in the auxiliary cylinder M. In case of a most extraordinary shock however, the rubber tip L fits into the opening N and an absolute compression of the air is produced without any chance of escape because of the packings O between the auxiliary cylinder M and the main cylinder D.

Any changes may be made in the particular construction shown and illustrated without departing from the spirit of my invention.

I claim:

1. The combination of two members one movable relatively to the other, and a shock absorber comprising a cylinder secured to one of the members, an extensible piston rod connected with the other member by a universal joint, and a piston connected with the piston rod and fitted into said cylinder, the piston having a solid face at the end adjacent to the cylinder head.

2. The combination of two members, one movable relatively to the other, and of a shock absorber comprising a cylinder secured to one of the members and having an opening at one end, a piston within said cylinder having a rounded periphery, and a piston rod rigidly attached at one end to said piston, and at the other to the other member by a universal joint, said piston rod extending through the opening in the cylinder, which opening is of such size as to permit a substantial amount of sidewise play of said rod, substantially as and for the purpose described.

3. The combination of two members, one movable relatively to the other, and of a shock absorber comprising a cylinder secured to one of the members and having an opening at one end, a piston within said cylinder having a rounded periphery, and an extensible piston rod attached at one end to said piston, and at the other to the other member by a universal joint, said piston rod extending through the opening in the cylinder, which opening is of such size as to permit a substantial amount of sidewise play of said rod, substantially as and for the purpose described.

4. A shock absorber comprising a main cylinder having an opening in one end, an auxiliary cylinder within said cylinder, said auxiliary cylinder having an opening at each end, a piston within said auxiliary cylinder having a rounded periphery, a valve mounted on said piston and adapted to close one of the openings in said auxiliary cylinder, and a piston rod attached to said piston and extending through the other opening in said auxiliary cylinder and the opening in said main cylinder, said last mentioned openings being of such size as to permit a substantial amount of sidewise play of the piston rod, substantially as and for the purpose described.

In testimony whereof, I have hereunto signed my name in the presence of two subscribing witnesses.

ROBERT G. MUELLER.

Witnesses:
 JOHN LOTKA,
 HANS v. BRIESEN.